United States Patent [19]

Zverev

[11] Patent Number: 4,614,301

[45] Date of Patent: Sep. 30, 1986

[54] DEVICE FOR PROPORTIONING AND FEEDING POWDER INTO BARREL OF DETONATION UNIT

[76] Inventor: Anatoly I. Zverev, ulitsa Sverdlova, 13, kv. 21, Kiev, U.S.S.R.

[21] Appl. No.: 645,704

[22] Filed: Aug. 30, 1984

[30] Foreign Application Priority Data

Sep. 2, 1983 [SU] U.S.S.R. .............................. 3638347

[51] Int. Cl.[4] .......................... B05B 1/24; F16K 1/00; B05C 5/04

[52] U.S. Cl. ........................................ 239/79; 239/85; 137/874

[58] Field of Search ............... 239/79, 85, 569; 406/1, 406/155; 137/83, 874; 251/301, 303

[56] References Cited

U.S. PATENT DOCUMENTS

| | | | |
|---|---|---|---|
| 2,827,020 | 3/1958 | Cook | 137/83 |
| 3,004,547 | 10/1961 | Hurvitz | 137/83 |
| 4,258,091 | 3/1981 | Dudko et al. | 239/79 X |

FOREIGN PATENT DOCUMENTS

| | | | |
|---|---|---|---|
| 1650459 | 11/1970 | Fed. Rep. of Germany | 137/83 |
| 1007747 | 3/1983 | U.S.S.R. . | |

OTHER PUBLICATIONS

"Detonation Spraying of Coatings", A. I. Zverev, Ye. A. Astakhov, Leningrad, Sudostroyeniye Publishers, 1979, pp. 192–195, Figures 104–105 w/Eng. trans.

*Primary Examiner*—Joseph F. Peters, Jr.
*Assistant Examiner*—Patrick N. Burkhart
*Attorney, Agent, or Firm*—Fleit, Jacobson, Cohn & Price

[57] ABSTRACT

A device for proportioning and feeding powder into a barrel of a detonation unit comprises a powder container communicating with a neutral gas pressure source, a bin accommodating two pipes which are coaxial during a powder feed cycle, the first pipe communicating with the powder container and being movable in relation to the second pipe which communicates with the barrel of the detonation unit, and a duct for the supply of a neutral gas to the inlet of the second pipe after proportioning of powder is over. The duct ends with a nozzle arranged at the inlet of the second pipe at an angle to its geometrical axis and is provided with a branch pipe whose first end is connected to the nozzle, while its second end is connected to the second pipe at some distance from its inlet, the first pipe being designed and arranged so that it is acted on by the neutral gas jet exiting from the nozzle and is thus displaced in relation to the second pipe.

2 Claims, 2 Drawing Figures

DEVICE FOR PROPORTIONING AND FEEDING POWDER INTO BARREL OF DETONATION UNIT

The present invention relates to powder metallurgy and is more specifically concerned with a device for proportioning and feeding powder into the barrel of a detonation unit.

The device according to the invention is best applicable to the ship-building, aircraft, instrument-making and other industries where flame spraying and detonation spraying are used.

There is known a device for feeding powder into the barrel of a detonation unit, which comprises a powder container communicating with a neutral gas pressure source and connected through a pipe to the barrel of the detonation unit. The powder is proportioned by an intermittent flow of neutral gas.

The pipe is provided with an open branch vertically arranged in a covered bin and communicating with the atmosphere through a throttle (cf. USSR Inventor's Certificate No. 1,007,747).

The device is disadvantageous in that some part of the detonation products is directed from the barrel into the powder container. This affects the accuracy of proportioning.

There is known another device for proportioning and feeding powder into the barrel of a detonation unit, comprising a powder container permanently communicating with a neutral gas pressure source, a bin accommodating two pipes which are coaxial during a powder feed cycle, whereof the first communicates with the powder container, while the second communicates with the barrel of the detonation unit. A neutral air duct is arranged parallel to the two pipes and serves to supply a neutral gas to the inlet of the pipe communicating with the barrel of the detonation unit. The pipe communicating with the powder container and the neutral gas duct are movable so that they can be alternately brought to the pipe communicating with the barrel, for which purpose they are kinematically coupled to a mechanical drive (cf. A. I. Zverev, S. Yu. Sharivker, E. A. Astakhov, "Detonatsionnoye napyleniye pokrytiy" /"Detonation Spraying of Coatings"/, Sudostroyeniye Publishers, Leningrad, 1979, pp. 193–194). The latter device is regarded as the prototype of the one in accordance with the invention.

The prototype device is disadvantageous in that it incorporates a number of movable parts, considering that it contains a mechanical drive kinematically coupled to the pipe communicating with the powder container and the neutral gas duct. Having a number of movable parts, the device is too complicated. The presence of movable parts affects the reliability of the device.

It is an object of the present invention to simplify the design of the device for proportioning and feeding powder into the barrel of a detonation unit.

It is another object of the invention to enhance the reliability of the device for proportioning and feeding powder into the barrel of a detonation unit.

It is still another object of the invention to improve the quality of spray coatings.

The invention provides a device for proportioning and feeding powder into a barrel of a detonation unit, which comprises a powder container communicating with a neutral gas pressure source, a bin accommodating two pipes which are coaxial during a powder feed cycle, whereof the first communicates with the powder container and is movable in relation to the second pipe communicating with the barrel of the detonation unit, and a duct for supplying a neutral gas to the inlet of the second pipe after a powder proportioning operation, which device is c h a r a c t e r i z e d in that the neutral gas ducts ends with a nozzle arranged at the inlet of the second pipe at an angle to its geometrical axis and is provided with a branch whose first end is connected to the nozzle, while its second end is connected to the second pipe at some distance from its inlet, the first pipe being arranged so that it is acted on by the neutral gas jet exiting from the nozzle and is thus displaced in relation to the second pipe.

It is preferred that the pipe communicating with the powder container have at its end a member interacting with the neutral gas jet exiting from the nozzle.

This member may be of any geometrical shape. It may be an ellipse, a circle, a triangle, or a square. It may also be of an irregular shape. The member increases the area over which the jet of neutral gas acts on the pipe, and thus provides for an accurate and trouble-free displacement of the pipe.

It is also preferred that the nozzle be arranged at an angle equal to or greater that 90° to the geometrical axis of the second pipe.

This provides for highly effective purging of the pipe communicating with the barrel.

The device according to the invention for proportioning and feeding powder to a barrel of a detonation unit is simpler in design and more reliable than the prototype device. It ensures more accurate proportioning of powdered materials than the prototype device.

Other objects and advantages of the present invention will become more apparent from a consideration of the following detailed description of a preferred embodiment thereof, taken in conjunction with the accompanying drawings, wherein.

Figure 2:
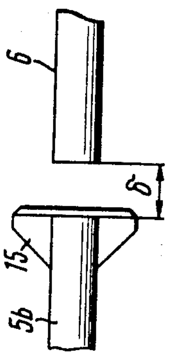
FIG. 2 is a view taken in the direction of the arrow A in FIG. 1.
Figure 1:
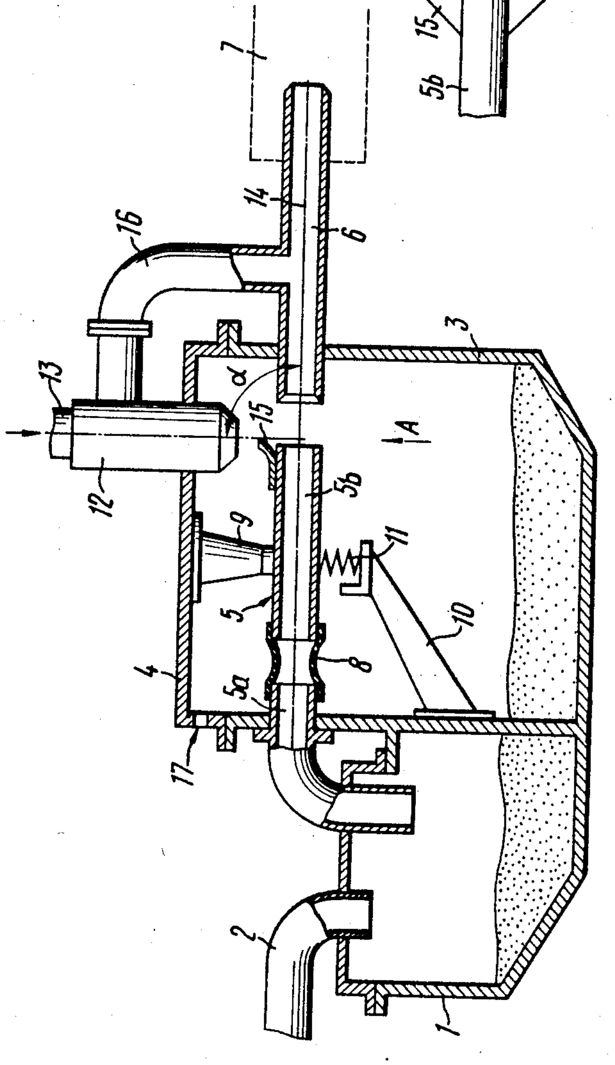
FIG. 1 is an elevation view of a device in accordance with the invention for proportioning and feeding powder into a barrel of a detonation unit.

Referring to the accompanying drawings, the device according to the invention for proportioning and feeding powder into a barrel of a detonation unit comprises a powder container 1 (FIG. 1) into which extends a pipe 2 connected to a neutral gas pressure source (not shown). Arranged next to the powder container 1 is a bin 3 covered with a lid 4 and accommodating two pipes, 5 and 6, which are coaxial during a powder feed cycle. The first pipe 5 communicates with the container 1. The second pipe 6 communicates with a barrel 7 of a detonation unit (not shown). The pipe 5 is composed of two parts, **5*a* and 5*b*, which are interconnected by a sealing collar 8 of an elastic material. The sealing 8 may also be a bellows, a spherical coupling, etc. The part 5*b* of the pipe 5 is interposed between guide stops 9 and 10 mounted on the lid 4 and the bin 3, respectively. The part 5*b* is loaded by a spring 11 which allows a displacement of the end of the pipe 5. Extending into the bin 3 is a nozzle 12 mounted at the end of a duct 13 communicating with the neutral gas pressure source. The nozzle 12 is arranged at the inlet of the second pipe 6 at an angle $\alpha$ to a geometrical axis 14. In the embodiment under review, the angle $\alpha$ is equal to 90°. The neutral gas jet exiting from the nozzle 12 purges the pipe 6 and also serves to displace the end of the pipe 5 in order to discontinue the supply of powder to the pipe 6. The proportioning of powder is made more accurate through the use of a member 15 (FIG. 2) mounted on the end of the pipe 5. The member 15 is a flat strip with one end bent upward. The member 15 prevents stalling of the flow at the end of the pipe 5, directing the flow upward and reducing its effect on the flow of powder from the pipe 5 into the bin 3**.

On end of a branch pipe 16 is connected to the nozzle 12. The opposite end of the branch pipe 16 is connected to the pipe 6 at some distance from its inlet. The branch pipe 16 serves for additional purging of the pipe 6.

The pipes 5 and 6 are arranged so that a gap $\delta$ is allowed between their ends facing each other. The gap $\delta$ allows a free displacement of the end of the pipe 5.

The bin 3 is vented through an opening 17 provided in the lid 4.

The device according to the invention for proportioning and feeding powder into a barrel of a detonation unit operates as follows.

During the entire period of operation, a neutral gas is continuously fed under pressure into the pipe 2. The flow of neutral gas produces a powder-in-gas suspension in the powder container 1. Under the pressure of neutral gas, the suspension is continuously directed into the pipe 5 which at this stage of operation is coaxial with the pipe 6. Through the pipe 6, powder is fed into the barrel 7 of the detonation unit.

By an instruction from a control console (not shown), neutral gas is fed under pressure for a specified period of time into the nozzle 12 and duct 13. On exiting from the nozzle 12, the gas acts on the member 15 and deflects the pipe 5 so that the latter is no longer coaxial with the pipe 6 communicating with the barrel 7 of the detonation unit.

As a result, the feeding of powder into the barrel 7 discontinues, preventing the effects of detonation products on the continuous flow of powder through the pipe 5. The neutral gas exiting from the nozzle 12 purges the pipe 6 communicating with the barrel 7 of the detonation unit. The purging is also done by neutral gas supplied through the branch pipe 16.

The operation of the nozzle 12 is more effective if it is arranged at an angle $\alpha = 90°$ to the geometrical axis 14 of the pipe 6. If $\alpha = 90°$, the purging of the pipe 6 prior to a detonation of the gas mixture in the barrel is more effective. At this point, a firing instruction is sent from the control console, and the gas mixture detonates in the spraying tip of barrel 7.

After the detonation, the supply of netural gas through the nozzle 12 and duct 13 discontinues. The spring 11 returns the pipe 5 to its original position so that it is again coaxial with the pipe 6. Powder is again supplied through the pipe 6 into the barrel 7 of the detonation unit.

Thus a specified dose of powder is supplied to the barrel of the detonation unit prior to a detonation of the gas mixture.

The above sequence of events is then repeated, the first step being a feeding of neutral gas into the duct 13 and nozzle 12 as described above.

The device according to the invention provides for more accurate and reliable proportioning and feeding of powder into the barrel of a detonation unit. A pilot device in accordance with the invention was installed in a detonation coating unit. In the course of operation, the device ensured a highly accurate proportioning of powder fed into the barrel. The device also eliminated the effect of the back pressure of the explosive mixture on the powder flow. The result is a better quality and durability of spray coatings.

What is claimed is:

1. A device for proportioning and feeding powder into a barrel of a detonation unit, comprising: a powder container; a neutral gas pressure source permanently communicating with said powder container; a bin; a first pipe having a first end and a second end and whose first end is in said powder container and second end is in said bin; a second pipe having a geometrical axis and having a first end and a second end and whose first end communicates with said barrel of said detonation unit, while its second end is in said bin at some distance from the second end of said first pipe; said second ends of said first and second pipes being coaxially arranged during a powder feed cycle, said second end of said first pipe being transversely displaceable from said second end of said second pipe; a duct for supplying a neutral gas into said bin; a nozzle arranged at an end of said neutral gas supply duct in said bin in proximity to said second end of said second pipe, said nozzle having an axis positioned at an angle to the geometrical axis of said second pipe; a branch pipe having a first end and a second end and whose first end is connected to said nozzle, while its second end is connected to said second pipe at some distance from its second end; said first pipe being designed and arranged so that it is acted on by a neutral gas jet exiting from the nozzle and is thus displaced in relation to said second pipe after a predetermined quantity of powder has been fed into a spraying tip of said detonation unit; and a means for bringing said second end of said first pipe into a position coaxial with said second end of said second pipe wherein a member interacting with the neutral gas jet exiting from said nozzle is mounted on said second end of said first pipe.

2. A device as claimed in claim 1, wherein the axis of said nozzle is arranged at an angle equal to or greater than 90° to the geometrical axis of said second pipe.

* * * * *